United States Patent [19]

Akimoto et al.

[11] Patent Number: 5,272,204
[45] Date of Patent: Dec. 21, 1993

[54] POLYMER/POLYOL COMPOSITION, PROCESSES FOR MAKING THE SAME AND POLYURETHANE THEREFROM

[75] Inventors: Keiichi Akimoto, Osaka; Takeshi Sumita, Ohtsu; Masahiro Matsuoka, Kyoto, all of Japan

[73] Assignee: Sanyo Chemical Industries, Ltd., Kyoto, Japan

[21] Appl. No.: 708,720

[22] Filed: May 31, 1991

[51] Int. Cl.$^5$ .................. C08K 5/05; C08K 5/06; C08L 75/04
[52] U.S. Cl. .................. 524/700; 524/714; 524/715; 524/762; 524/773; 524/850; 524/851; 524/853; 524/854; 524/855; 524/858; 524/881; 521/137; 525/123; 525/131; 525/404; 525/440; 525/445
[58] Field of Search .............. 521/137; 525/123, 131, 525/404, 440, 445; 524/700, 714, 715, 762, 773, 850, 851, 853, 854, 855, 858, 881

[56] References Cited

U.S. PATENT DOCUMENTS

| | | | |
|---|---|---|---|
| 4,172,825 | 10/1979 | Shook et al. | 521/137 |
| 4,242,249 | 12/1980 | Van Cleve et al. | 521/137 |
| 4,463,107 | 7/1984 | Simroth et al. | 524/762 |
| 4,931,483 | 6/1990 | Matsuoka et al. | 524/773 |

*Primary Examiner*—Maurice J. Welsh
*Assistant Examiner*—Rabon Sergent
*Attorney, Agent, or Firm*—Oblon, Spivak, McClelland, Maier & Neustadt

[57] ABSTRACT

Polymer/polyol compositions, obtained by polymerizing an ethylenically unsaturated monomer in situ in a polyol in the presence of inner-olefin containing at least 5 carbon atoms, are of lower viscosity and can provide polyurethanes having improved properties. Polymer/polyol compositions, obtained by polymerizing an ethylenically unsaturated monomer, in situ in a polyol in the presence of an azo compound and a peroxide having a 10 hours half-life period temperature which is lower by at least 10° C. than that of the azo compound, have improved stability even at higher styrene content.

17 Claims, No Drawings

POLYMER/POLYOL COMPOSITION, PROCESSES FOR MAKING THE SAME AND POLYURETHANE THEREFROM

BACKGROUND OF THE INVENTION

1. Field of the Invention

This invention relates to polymer/polyol compositions that are suitable for producing polyurethanes. The invention also relates to methods for making such compositions and polyurethanes therefrom.

2. Description of the Prior Art

It is known to produce polyurethanes by reacting an organic polyisocyanate with a polymer/polyol composition, obtained by polymerizing one or more ethylenically unsaturated monomers (such as acrylonitrile and/or styrene) in situ in a polyol (such as polyether polyol).

The viscosity of known polymer/polyol compositions increases in accordance with an increase in polymer content. The increased polymer content is required in order to produce polyurethanes of improved properties, such as compressive hardness. Additionally, in polymer/polyol compositions containing higher styrene content, the dispersibility is adversely affected, while higher styrene content is desirable in order to inhibit scorching of polyurethanes.

SUMMARY OF THE INVENTION

It is an object of the present invention to provide polymer/polyol compositions, which are of lower viscosity, even at a higher polymer content.

It is another object of this invention to provide polymer/polyol compositions, capable of providing polyurethanes having improved properties, such as compressive hardness.

It is still another object of this invention to provide polymer/polyol compositions of improved dispersibility even at higher styrene content.

It is yet another object of the invention to provide polymer/polyol compositions capable of producing polyurethanes without scorching.

Briefly, these and other objects of the present invention, which describes hereinafter will become more readily apparent, have been attained broadly by providing a polymer/polyol composition, obtained by polymerizing an ethylenically unsaturated monomer in situ in a polyol in the presence of an inner-olefin containing at least 5 carbon atoms, or by polymerizing an ethylenically unsaturated monomer in situ in a polyol in the presence of initiators comprising an azo compound and a peroxide having a 10 hours half-life period temperature which is at least 10° C. lower than that of the azo compound.

DETAILED DESCRIPTION OF THE PREFERRED EMBODIMENTS

As an embodiment of this invention, polymer/polyol compositions can be produced by polymerizing (1) an ethylenically unsaturated monomer in situ in (2) a polyol in the presence of (3) an inner-olefin containing at least 5 carbon atoms.

Suitable inner-olefins (3) include straight-chain and branched ones, containing usually at least 5, preferably 6-30, more preferably 8-20, particularly 9-18 carbon atoms and having a double bond (C=C) at non-alpha-position (2-, 3-, 4-position and so on). Branched olefins are preferred. Olefins containing less than 5 carbon atoms have boiling points which are too low; while olefins containing carbon atoms exceeding 30 result in solidification. Illustrative of suitable inner-olefins are 2-, 3- and 4- hexenes, octenes, nonenes, decenes, dodecenes, tetradecenes, hexadecenes, octadecenes, eicosenes, heneicosenes, docosenes, tricosenes, tetracosenes, pentacosenes, hexacosenes, and the like, as well as mixtures of two or more of them. Among these, preferred are octenes, nonenes, decenes, dodecenes, tetradecenes, hexadecene and octadecenes; and particularly preferred are nonenes.

Suitable ethylenically unsaturated monomers (1) include, for example, aromatic hydrocarbon monomers, such as styrene, alpha-methyl styrene, and the like; unsaturated nitriles, such as (meth)acrylonitrile [acrylonitrile and methacrylonitrile; similar expressions are used hereinafter]; and (meth)acrylate esters, including alkyl (meth)acrylates containing 1-30 or more carbon atoms in the alkyl group, such as methyl, butyl, nonyl, decyl, undecyl, dodecyl, tridecyl, tetradecyl, pentadecyl, hexadecyl, octadecyl, eicosyl and docohyl (meth)acrylates.

Other examples of suitable ethylenically unsaturated monomers are alpha-olefins containing usually at least 5 carbon atoms, preferably 6-30, more preferably 8-20, particularly 11-18 carbon atoms; and include, for example, 1-hexene, 1-octene, 1-decene, 1-dodecene, 1-tetradecene, 1-hexadecene, 1-octadecene, 1-eicosene, 1-heneicosene, 1-docosene, 1-tricosene, 1-tetracosene, 1-pentacosene, 1-hexacosene, and the like, as well as mixtures of two or more of them.

One or more monomers other than above may also be used if necessary. Suitable examples of such monomers include ethylenically unsaturated carboxylic acids and derivatives thereof, such as (meth)acrylic acids, and (meth)acrylamides; aliphatic hydrocarbon monomers, such as ethylene, propylene and iso-butylene; fluorine-containing vinyl monomers, such as perfluorooctylethyl (meth)acrylates; nitrogen-containing vinyl monomers, such as dialkylaminoethyl (meth)acrylates and morpholinoethyl (meth)acrylates; vinyl-terminated silicones, and the like.

Among these ethylenically unsaturated monomers (1), preferred are (i) combinations of alpha-olefin with one or more other monomers, and (ii) at least one monomer selected from the group consisting of aromatic hydrocarbon monomers, unsaturated nitriles and (meth-)acrylate esters. More preferred are combinations of alpha-olefin with at least one monomer selected from the group consisting of aromatic hydrocarbon monomers, unsaturated nitriles and (meth)acrylate esters.

In producing polymer/polyols by polymerizing one or more ethylenically unsaturated monomers (1), the content of aromatic hydrocarbon monomer is generally 0-90%, preferably 0-80%, based on the total weight of the monomers (1). Polymer/polyols, obtained by using more than 90% of styrene, provide polyurethanes of poor rigidity. The content of unsaturated nitrile is usually 0-99.5%, preferably 20-55%. Weight ratio of aromatic hydrocarbon monomer/unsaturated nitrile is usually 0/100-80/20, preferably 44/55-70/30. The content of (meth)acrylate esters is generally 0-50%, preferably 0-30%. Use of more than 50% of (meth)acrylate esters results in viscous polymer/polyols at higher polymer content. The amount of monomers other than above is usually 0-30%, preferably 0-10%. The content of alpha-olefin containing at least 5 carbon atoms is usually 0.5–50%, preferably 1–20%, based on the total weight of the monomers. When the content of alpha-olefin is less than 0.5%, the resulting polymer/polyols become viscous at higher polymer content; and use of more than 50% causes difficulties in producing polyurethane foams. In the above-mentioned compositions and hereinafter, % represents percent by weight (wt %) unless otherwise specified.

Suitable polyols (2) employed for producing polymer/polyol compositions according to this invention include, for example, polyether polyols, polyester polyols, and mixtures of them, both of which polyols are usually used as raw materials for producing polyurethanes.

Illustrative of such polyether polyols are those obtainable by addition of alkylene oxide to compounds containing at least two (preferably two to eight) active hydrogen atoms [such as polyhydric alcohols, polyhydric phenols, amines, polycarboxylic acids, phosphoric acids and the like] and mixtures of two or more of such adducts.

Suitable examples of polyhydric alcohols include diols, for example, alkylene glycols, such as ethylene glycol, propylene glycol, 1,3- and 1,4-butane diols, 1,6-hexane diol, neopentyl glycol, diethylene glycol and the like, and cyclic group-containing diols, as written in JPN Patent Publication No. 1474/1970, such as bis(hydroxymethyl) cyclohexane, bis(hydroxyethyl)benzene, and the like; trihydric alcohols, such as glycerol, trimethylolpropane, trimethylolethane, hexane triol, triethanol amine, and the like; tetrahydric alcohols, such as pentaerythritol, alpha-methylglucoside, diglycerol, and the like; and polyols having higher functionality (5–8 or higher), for example, sugar alcohols, including pentitols (such as adnitol, arabitol and xylitol) and hexitols (such as sorbitol, mannitol, iditol, talitol and dulcitol), saccharides, including monosaccharides (such as glucose, mannose, fructose, galactose, allose, altrose, talose, gulose, idose, sorbose, psicose and tagatose), di- or oligo-saccharides (such as sucrose, trehalose, cellobiose, lactose and raffinose), glycosides, such as glucosides of polyols (for instance, glycols, such as ethylene glycol and propylene glycols, alkane polyols, such as glycerol, trimethylolpropane, hexane triol and pentaerythritol); poly(alkane polyol)s (polyglycerols, such as triglycerol and tetraglycerol, and polypentaerythritols, such as dipentaerythritol and tripentaerithritol), and cycloalkane polyols, such as tetrakis(hydroxymethyl)-cyclohexanol.

Exemplary of suitable polyhydric phenols are mononuclear phenols, such as hydroquinone, catechol, resorcin, pyrogallol and phloroglucinol, and poly-nuclear phenols, for example, bisphenols, such as bisphenol A, bisphenol F, bisphenol sulfon and the like, as well as phenol-formaldehyde condensation products (novolaks), such as polyphenols as disclosed in U.S. Pat. No. 3,265,641.

Suitable amines are inclusive of ammonia; alkanol amines, such as mono-, di- and tri- ethanol amines and isopropanol amines, and aminoethylethanolamine and the like; aliphatic, aromatic, araliphatic and alicyclic monoamines, for example, $C_1$–$C_{20}$ alkyl amines (such as methyl, ethyl, isopropyl, butyl, octyl and lauryl amines, and the like), aniline, toluidine, naphthyl amines, benzyl amine, cyclohexyl amine and the like; aliphatic, aromatic, araliphatic and alicyclic polyamines, such as $C_2$–$C_6$ alkylene diamines (such as ethylene diamine, propylene diamine, hexamethylene diamine and the like), polyalkylene polyamines (such as diethylene triamine, triethylene tetramine and the like), aromatic diamines (such as tolylene diamines, phenylene diamines, xylylene diamines, methylene dianilines, diphenylether diamines and other aromatic polyamines), alicyclic diamines (such as isophorone diamine, cyclohexylene diamines, dicyclo-hexylmethane diamines and the like); and heterocyclic polyamines, such as piperazine, N-aminoethylpiperazine, and other hetero-cyclic polyamines, written in JPN Patent Publication No. 21044/1980.

Two or more of these active hydrogen atom-containing compounds may also be used in conjunction.

Among these active hydrogen atom-containing compounds, preferred are polyhydric alcohols. Among polyhydric alcohols, preferred are ethylene glycol, propylene glycol, glycerol, trimethylol propane, hexane triol, pentaerythritol, methylglucoside, sorbitol and sucrose.

Suitable alkylene oxides (hereinafter referred to as AO), employed for producing polyether polyols, include, for example, ethylene oxide (hereinafter referred to as EO), propylene oxide (hereinafter referred to as PO), 1,2-, 2,3- , 1,3- and 1,4-butylene oxides, styrene oxide, epichlorohydrin and the like, as well as combinations of two or more of them (block and/or random addition). Among these, preferred are EO and/or PO, and combination thereof with smaller amount (such as up to 5% based on the total weight of AO) of other AO. More preferred are PO and combination of PO with EO.

Addition of AO to active hydrogen atom-containing compounds can be carried out in the usual way, with or without catalysts such as alkaline catalysts, amine catalysts and acidic catalysts, under normal or elevated pressure, in a single step or multi-stages.

In general, among polyether polyols, preferred are those containing polyoxypropylene chain, and those containing both polyoxypropylene and polyoxyethylene chains. Such polyether polyols, include those obtained by addition of PO to active hydrogen atom-containing compound(s) as stated above; block adducts obtained by adding PO and EO to active hydrogen atom-containing compound(s), in such manners as (1) adding PO followed by EO (tipped), (2) adding PO-EO-PO-EO in this order (balanced), (3) adding EO-PO-EO in this order, and (4) adding PO-EO-PO in this order (activated secondary); random adducts, such as (5) mixed-adding EO/PO; and random/block adducts, such as (6) adding PO-EO/PO-optionally PO-EO in this order, as written in JPN Lay-open Patent No. 209920/1982, and (7) adding EO/PO followed by EO, as described in JPN Lay-open Patent No. 13700/1978. (In the above, EO/PO means a mixture of EO and PO.) Smaller amount (for instance, up to 5% based on the total weight of AO) of other AO (such as butylene oxides, styrene oxide) may be contained in any of PO and/or EO in the above.

The content of polyoxyethylene chains (hereinafter referred to as EO content) may be varied widely.

When moderate or slow curability is desirable, EO content is generally 25% or less, based on the total weight of AO. In case where rapid curability is required, EO content is usually at least 5%, preferably 7–50%, more preferably 10–40%, in view of reactivity, curing characteristics, initial physical properties, compatibility and unform reaction with isocyanates, and workability. There may be used polyether polyols of EO content less than 5% in combination with ones of EO content more than 5%, or ones of EO content more than 50% with ones of EO content less than 50%, so as to provide an average EO content within the above range.

For rapid curability, particularly preferred are polyols containing terminal polyoxyethylene chains. Terminal EO content is usually at least 5%, preferably at least 7, more preferably 7–30%. Internal EO content is generally at most 50%, preferably 10–40%. The primary hydroxyl content of such polyols is usually at least 20%, preferably at least 30%, more preferably at least 50%, most preferably at least 70%.

Suitable polyester polyols are inclusive of condensation products of polyols dihydric alcohols (such as ethylene glycol, propylene glycol, 1,3- and 1,4-butane diols, 1,6-hexane diol, neopentyl glycol, and diethylene glycol) or combinations thereof with trihydric or higher functional polyhydric alcohols (such as glycerol, trimethylolpropane and the like) and/or polyether polyols (such as those described above) with dicarboxylic acids (for example, aliphatic or aromatic dicarboxylic acids, such as glutaric, adipic, sebacic, fumaric, maleic, phthalic and terephthalic acids) or ester-forming derivatives thereof (anhydrides and lower alkyl esters, such as maleic and phthalic anhydrides, dimethyl terephtharate, and the like); and ring-opening polymerization products of lactones (such as epsilon-caprolactone).

Instead of or in combination with these polyols (polyether polyols and/or polyester polyols), modified polyols, for example, urethane-modified polyols (OH-terminated urethane prepolymers) prepared from organic polyisocyanates and excess of these polyols, and polyols containing polymerizable unsaturated bonds in the molecules (such as maleic anhydride-modified polyols) may also be employed for producing polymer/polyol compositions in accordance with this invention.

Among these polyols (2), preferred are polyether polyols.

These polyols (polyether polyols or other high molecular weight polyols), used for producing polymer/polyol compositions according to the invention, have usually 2–8 hydroxyl groups, preferably 2.3–4 hydroxyl groups (average). Hydroxyl number (hereinafter referred to as OHV) of these polyols is usually 200 or less, preferably 15–100, more preferably 20–70. Polyols having OHV more than 200 cause difficulty in foaming and result in too rigid and brittle polyurethanes. Molecular weight of these polyols is usually 2000–30000 or higher, preferably 2500–10000.

These polyols (polyether polyols or other high molecular weight polyols) can be used as a mixture of those having different OHV, for instance, a mixture of a major amount (usually at least 50%) of those having OHV of 70 or less and those having OHV of 80–500. These high molecular weight polyols may also be used in combination with a minor amount (for example, 20% or less, particularly 5% or less) of low molecular weight polyols having high OHV (such as 700 or more). Examples of such low molecular weight polyols include polyhydric alcohols, as mentioned above as the raw materials for polyether polyols, as well as low mole AO (such as EO and/or PO) adducts of active hydrogen atom-containing compounds (such as polyhydric alcohols, amines and so on, as described above).

In producing polymer/polyol composition, in accordance with this invention, the amount of said ethylenically unsaturated monomer (1) is generally 1–80 parts, preferably 5–60 parts, per 100 parts of the total amount of said polyol (2) and said monomer (1). Using said monomer above 80 parts results in phase separation into polyol and polymer phases. Amounts lower than 1 part leads to polyurethanes of poor physical properties, such as compressive hardness. In the above-mentioned compositions and hereinafter, "parts" represents parts by weight unless otherwise specified. The amount of said inner-olefins (3) contain usually at least 5 carbon atoms is usually 0.5–50%, preferably 1–20%, based on the total weight of (1), (2) and (3).

Preparation of polymer/polyol compositions according to this invention can be carried out in the usual way. Suitable methods include, for example, those by polymerizing monomer in polyol in the presence of polymerization initiator (such as radical generators), as described in U.S. Pat. No. 3,383,351, JPN Patent Publication Nos. 24737/1964 and 47999/1972 and JPN Lay-open Patent No. 15894/1975; and those by grafting polymer, prepared from monomer beforehand, to polyol in the presence of radical generator, as described in JPN Patent Publication No. 47597/1972. Preferred is the former method.

Polymerization is usually carried out in the presence of polymerization initiators. Suitable initiators are free radical generators, for example, azo compounds, peroxides and others. Examples of suitable azo compounds include 2,2'-azobisisobutyro-nitrile (hereinafter referred to as AIBN) {65° C.}, 2,2'-azobis(2,4-dimethylvaleronitrile) (hereinafter referred to as AVN) {51° C.}, 2,2'-azobis(2-methylbutyronitrile {67° C.}, 1,1'-azobis(cyclohexane-1-carbonitrile) (hereinafter referred to as ACCN) {88° C.}, 2-phenyl-azo-4-methoxy-2,4-dimethylvaleronitrile {122° C.}, 1-[(1-cyano-1methylethyl)azo] formimido(2-carbamoylazo) iso-butyronitrile {104° C.}, 2,2'-azobis(2,4,4-trimethylpentane) azodi-t-octane {110° C.}, 2,2'-azobis(2methylpropane)azodi-t-butane {160° C.}, dimethyl 2,2-azobis(2-methylpropionate) {66° C.}, 2,2'-azobis[2-(hydroxymethyl)] propionitrile {77° C.}, and the like. Illustrative of suitable peroxides are percarbonates, for example bis(4-t-butylcyclohexyl) peroxydicarbonate (hereinafter referred to as TCP) {44° C.}, di-3-methoxybutyl peroxydicarbonate {43° C.}, di-sec-butyl peroxydicarbonate {45° C.}, di-isopropyl peroxydicarbonate, t-butyl peroxyiso-propylcarbonate, and the like; diacyl peroxides, such as isobutyryl peroxide (hereinafter referred to as IBP) {33° C.}, 2,4-dichlorobenzoyl peroxide {54° C.}, lauroyl peroxide {61° C.}, dibenzoyl peroxide, di-t-butyl peroxide, dicumyl peroxide, and the like; alkyl peresters, such as t-butyl peroxyneodecanoate (hereinafter referred to as BPND) {47° C.}, t-butyl peroxypivalate {45° C.}, 2,5-dimethyl-hexane-d2,5-diper-2-ethylhexoate, t-butyl peroxy(2-ethyl-hexanoate), t-butyl percrotonate, t-butyl perisobutyrate, di-t-butyl perphthalate and the like; methyl isobutyl ketone peroxide, t-butyl hydroperoxide, 1,1-di-t-butyl peroxy-3,3,5-trimethylcyclohexane and so on; and peroxides other than above, as written in JPN Ptent Lay-open No. 76517/1986. In the above, the numerical value within braces { } represents a 10 hours half-life period temperature, that is the temperature providing half-life period of 10 hours.

Other initiators include, for instance, persulfates, perborates, persuccinates and so on. Among these initiators, preferred are azo compounds (especially AIBN and AVN), peroxides (especially TCP and BPND), and particularly combinations of them described bellow.

As another embodiment of the present invention, polymer/polyol compositions are produced by polymerizing said monomer (1) in situ in said polyol (2) in the presence of initiators comprising (A) an azo compound and (B) a peroxide having a 10 hours half-life period temperature which is lower by at least 10° C. than that of the azo compound. Peroxides preferably have half-life period temperature not more than 10 seconds. Illustrative examples of such combinations of initiators are as follows:

| (A) | AIBN | AIBN | AIBN | ACCN | ACCN | ACCN | AVN | ACCN AIBN BPND | ACCN AIBN BPND IBP | ACCN AVN IBP | AIBN AVN BPND | AIBN AVN BPND TCP | AVN |
|---|---|---|---|---|---|---|---|---|---|---|---|---|---|
| (B) | BPND | TCP | IBP | BPND | TCP | IBP | IBP | | | | | | BPND IBP |
| *, °C. | 17 | 21 | 32 | 41 | 44 | 55 | 18 | 41 | 55 | 55 | 17 | 21 | 18 |

*difference of 10 hours half-life period temperatures

The initiators in this invention usually comprises 10–90% preferably 20–80% of the azo compound, and 10–90% preferably 20–80% of said peroxide.

In producing polymer/polyol compositions, in accordance with the invention, the amount of polymerization initiator is usually 0.05–20%, preferably 0.1–15%, more preferably 0.2–10%, based on the weight of the monomer (1).

Polymerization can be performed in the absence of solvent or alternatively in the presence of one or more solvents (particularly in case of producing polymer/polyol compositions of high polymer content). Suitable solvents include, for example, benzene, toluene, xylene, acetonitrile, ethyl acetate, hexane, heptane, dioxane, N,N-dimethylformamide, N,N-dimethylacetoamide, iso-propanol, n-butanol and the like.

Polymerization may also be carried out in the presence of known chain transfer agents, if necessary. Illustrative of suitable chain transfer agents are halogenated hydrocarbons, such as carbon tetrachloride, carbon tetrabromide and chloroform; alcohols, such as isopropanol, methanol, 2-butanol and allyl alcohol; alkyl mercaptans, such as dodecyl mercaptan and mercaptoethanol; and enolethers as described in JPN Lay-open Patent No. 31,880/1980.

Polymerization may be performed continuously or batchwise. Polymerization is carried out at temperature above the decomposition temperature of the polymerization initiator, usually at 60°–180° C., preferably at 90°–160° C., more preferably at 100°–150° C., under atmospheric pressure, under pressure or under increased reduced pressure.

Polymer/polyol compositions obtained after polymerization may be used as raw materials for polyurethane, as such without any after-treatment; but it is desirable to remove impurities such as decomposition products of polymerization initiators, unreacted monomers, organic solvents and so on, by conventional means.

Polymer/polyol compositions thus obtained are translucent or opaque, white or brownish yellow dispersions, in which all the polymerized monomers (namely, polymers) are stably dispersed in polyols.

Polymer content of said polymer/polyol compositions is generally 1–80%, preferably 3–60%, more preferably 5–20%.

OHV of polymer/polyol compositions is generally 5–100, preferably 7–90, more preferably 15–80, most preferably 20–70 mgKOH/g.

In producing polyurethanes from polymer/polyol composition (a), according to the present invention, one or more other active hydrogen atom-containing compounds may be used in combination, if desired. Such compounds include, for example, high molecular polyols (b) and low molecular weight active hydrogen atom containing compounds (c), and combinations of (b) and (c).

Examples of suitable high molecular weight polyols (b) are polyether polyols, polyester polyols, urethane-modified polyols, and vinyl-modified polyols or polymer/polyols other than (a). Suitable polyether polyols and polyester polyols include the same ones as described as the raw materials for polymer/polyol compositions. Examples of polymer/polyols other than (a) are those obtainable by polymerizing ethylenically unsaturated monomers such as those described above (i.e., acrylonitrile and styrene) in situ in these polyols (such as polyether polyols and/or polyester polyols, and the like) without using inner-olefins and without using the particular combinations of initiators as mentioned above, for instance, those written in JPN Lay-open Patents No. 101899/ 1979 and No. 122396/1979. Polyols from natural oils such as castor oil, modified polyols as mentioned above, polybutadiene polyols and hydroxyl-containing vinyl polymers (such as acrylic polyols), as described in JPN Lay-open Patents No. 57413/1983 and No. 57414/1983, for instance, may also be used. Such high molecular weight polyols (b) usually contain 2–8 or more hydroxyl groups and have OH equivalent weight of 200–4000, preferably 3–8 hydroxyl groups and have OH equivalent weight of 400–3000. Among these polyols (b), preferred are polyether polyols.

Examples of suitable low molecular weight active hydrogen atom-containing compounds (c) include compounds containing at least two (preferably 2–3, particularly 2) active hydrogen atoms (such as hydroxyl, amino and mercapto, preferably hydroxyl) and having a molecular weight of 500 or less (preferably 60–400) or an equivalent weight (molecular weight per active hydrogen atom-containing groups) of at least 30 and less than 200, which compounds are generally called chain-extenders or crosslinkers. Such compounds include, for instance, low molecular weight polyols and aminoalcohols. Illustrative examples of such polyols are dihydric alcohols, such as ethylene glycol, diethylene glycol, propylene glycols, dipropylene glycol, 1,3- and 1,4-butane diols, neopentyl glycol and 1,6-hexane diol; alcohols containing three or more hydroxyl groups, such as glycerol, trimethylol propane, pentaerythritol, diglycerol, alpha-methylglucoside, sorbitol, xylitol, mannitol, dipentaerythritol, glucose, fructose, sucrose and the like; polyhydroxyl componds having molecular weight of 200–400, obtainable by adding a smaller amount of one or more AO (such as EO and/or PO) to active hydrogen atom-containing compounds (such as polyhydric alcohols as mentioned above), for example polyethylene glycols and polypropylene glycols; cyclic group-containing diols, as disclosed in JPN Patent Publication No.1474/1970, for example, AO (such as EO and/or PO) adducts of polyhydric phenols (such as bisphenol A, hydroquinone and the like; tertiary or quaternary nitrogen atom-containing polyols, for instance, those as written in JPN Lay-open Patent No.130699/1979, N-alkyldialkanol amines (such as N-methyldiethanol amine, N-butyldiethanol amine and the like and quaternarized products of these amines), and trialkanol amines (such as triethanol amine, tripropanol amines and the like); and sulfur-containing polyols, such as thiodiglycol. Suitable aminoalcohols inculude, for example, mono- and di-alkanolamines, such as mono- and di- ethanol amines and propanol amines. Among these, preferred are low molecular weight polyols (especially diols). More preferred are ethylene glycol, 1,4-butane diol, neopentyl glycol, 1,6-hexane diol, and mixtures of two or more of them.

Other high molecular weight polyols (b) and/or low molecular weight active hydrogen atom-containing compounds (c) may be added to raw materials (polyether polyols) of polymer/polyol compositions (a) according to this invention, during production of (a), or after production of (a).

In producing polyurethanes, using, as active-hydrogen atom-containing components, polymer/polyol compositions (a) according to this invention, with or without other high molecular weight polyols (b) and/or low molecular weight active hydrogen atom-containing compounds (c), the amount of (a) is usually at least 5%, preferably at least 10%, more preferably at least 50%, the amount of (b) is generally 0–95%, preferably 0–80%, more preferably 0–50%, and the amount of (c) is usually 0–30%, preferably 0–25%, more preferably 0–10%, based on the total weight of the active-hydrogen atom-containing components such as (a) and optionally (b) and/or (c). Use of lower amount of (a) results in polyurethanes of poor physical properties, such as compressive hardness. Using larger amount of (c) causes high exotherm, and results in scorching, or molded articles having a tendency to form blister in the vicinity of the inlet and being too rigid and brittle.

In producing polyurethanes according to the invention, there can be used any of organic polyisocyanates, conventionally employed for production of polyurethanes. Suitable polyisocyanates include aromatic polyisocyanates containing 6–20 carbon atoms (except carbon atoms in NCO groups), aliphatic polyisocyanates containing 2–18 carbon atoms, alicyclic polyisocyanates containing 4–15 carbon atoms, araliphatic polyisocyanates containing 8–15 carbon atoms, and modified polyisocyanates of these polyisocyanates containing urethane, carbodiimide, allophanate, urea, biuret, urethdione, urethonimine, isocyanurate and/or oxazolidone groups. Illustrative examples of polyisocyanates are: aromatic polyisocyanates, such as 1,3- and/or 1,4-phenylenediisocyanates, 2,4- and/or 2,6-tolylenediisocyanates (TDI), crude TDI, diphenylmethane-2,4'-and/or 4,4'-diisocyanates (MDI), crude MDI or polymethylene-polyphenylenepolyisocyanates (PAPI) obtained by phosgenation of crude diamino-diphenyl methane, condensation products of formaldehyde with aromatic amine such as aniline, or a mixture thereof; mixtures of diamino-diphenyl methane and minor amount (such as 2–20%) of polyamine of 3 or higher functionality; naphthalene-1,5-diisocyanate, triphenylmethane-4,4',4''-triisocyanate, m-and p-isocyanato-phenyl sulfonyl isocyanate, and the like; aliphatic polyisocyanates, such as ethylenediisocyanate, tetramethylenediisocyanate, hexamethylenediisocyanate, dodecamethylenediisocyanate, 1,6,11-undecanediisocyanate, 2,2,4-trimethylhexanediisocyanate, lysine diisocyanate, 2,6-diisocyanato-methyl caproate, bis(2-isocyanato-ethyl fumarate, bis(2-isocyanato-ethyl) carbonate, 2-isocyanatoethyl-2,6-diisocyanatohexanoate, and the like; alicyclic polyisocyanates, such as isophorone diisocyanate, dicyclohexylmethane diisocyanates (hydrogenated MDI), cyclohexylene diisocyanates, methylcyclohexylene diisocyanates (hydrogenated TDI), bis(2-isocyanato-ethyl) 4-cyclohexene-1,2-dicarboxylate, and the like; araliphatic polyisocyanates, such as xylylene diisocyanates, diethylbenzene diisocyanates, and the like; and modified polyisocyanates of these polyisocyanates, containing urethane, carbodimide, allophanate, urea, biuret, urethdione, urethimine, isocyanurate and/or oxazolidone groups, such as urethane-modified TDI, carbodiimide-modified MDI, urethane-modified MDI, trihydrocarbyl phosphate-modified MDI, and the like; as well as mixtures of two or more of them, such as combination of modified MDI with urethane-modified TDI (isocyanate-terminated prepolymer). Examples of suitable polyols, used for producing urethane-modified polyisocyanates (isocyanate-terminated prepolymer obtained from a polyol with excess polyisocyanate, such as TDI, MDI), are polyols having equivalent weight of 30–200, for example, glycols, such as ethylene glycol, propylene glycol, diethylene glycol and dipropylene glycol; triols, such as trimethylol propane and glycerol, polyols of higher functionality, such as pentaerythritol and sorbitol; and AO (EO and/or PO) adducts of them. Among these, preferred are those having a functionality of 2–3. Free isocyanatecontent of these modified polyisocyanates and prepolymers are generally 8–33%, preferably 10–30%, more preferably 12–29%. Among these polyisocyanates, preferred are aromatic polyisocyanates and modified ones therefrom. More preferred are TDI (including 2,4- and 2,6-isomers, mixtures of them and crude TDI) and MDI (including 4,4'- and 2,4'-isomers, mixtures of them and crude MDI or PAPI), and modified polyisocyanates containing urethane, carbodiimide, allophanate, urea, biuret and/or isocyanurate groups, derived from these polyisocyanates (TDI and/or MDI). The most preferred are TDI, crude MDI and modified MDI.

Polyurethanes, produced from polymer/polyol compositions, in accordance with the present invention, include foamed or cellular compositions (foams), and non-cellular compositions (such as elastomers, sheet materials and so on).

In producing polyurethane foams, foaming can be attained by using blowing agents, or by introducing gases, such as air (air loading), or combination of them. Examples of suitable blowing agents are reactive blowing agents, such as water, which generates carbon dioxide by reaction with polyisocyanate, and the like; and volatile blowing agents, for example, halogen-substituted aliphatic hydrocarbons, such as methylene chloride, chloroform, compressive hardethylidene dichloride, vinylidene chloride, trichloro-fluoromethane, dichlorofluoromethane and the like; low-boiling hydrocarbons, such as butane, hexane, heptane and the like; and volatile organic solvents without halogen, such as acetone, ethyl acetate, diethylether and the like; as well as combinations of two or more of them. Among these, preferred are halogen-substituted aliphatic hydro-carbons (particularly freons, such as methylene chloride and trichlorofluoromethane), water and combinations of them. The amount of blowing agents can be varied according to the desired density of polyurethanes, which may vary widely, for instance, from 0.01 to 1.4 g/cm³.

In producing polyurethanes, according to this invention, organic polyisocyanates and active hydrogen atom-containing components such as (a), and optionally (b) and/or (c) and/or water are reacted in such an amount to provide NCO index of usually 80-140, preferably 85-120, more preferably 95-115, most preferably 100-110. Furthermore, drastically higher NCO index than the above-mentioned range, for instance 150-5000 or more, preferably 300-1000, may be employed to introduce isocyanurate linkages into polyurethanes (resins or foams).

In producing polyurethanes according to this invention, there may be used, if necessary, any known materials, such as catalysts, and other auxiliaries, usually employed in producing polyurethanes.

Examples of suitable catalysts are amine catalysts, including tertiary amines, secondary amines, alkanolamines and quaternary ammonium hydroxides, for example, triethylamine, tributylamine, N-methylmorpholine, N-ethylmorpholine, N,N,N',N'-tetramethylethylenediamine, pentamethyldiethylenetriamine, triethylenediamine, N-methyl-N'-dimethylaminoethyl-piperazine, N,N-dimethylbenzylamine, N,N-dimethylcyclohexylamine, N,N,N',N'-tetramethyl-1,3-butanediamine, 1,2-dimethylimidazole, dimethylamine, N-methyldiethanolamine, N-ethyldiethanolamine, N,N-dimethylethanolamine, N,N-diethylethanolamine, tetraalkylammonium hydroxides (such as tetramethylammonium hydroxide), aralkyltrialkylammonium hydroxides (such as benzyltrimethylammonium hydroxide), diazabicycloalkenes as disclosed in U.S. Pat. No. 4,524,104 (such as DBU), and the like; alkaline catalysts, including phenoxides, hydroxides, alkoxides and carboxylates of alkali metals (such as sodium and potassium), for example, sodium phenolate, potassium hydroxide, sodium methoxide, potassium acetate, sodium acetate, potassium 2-ethylhexanoate and the like; phosphines, such as triethylphosphine; metal chelete compounds, such as potassium-salicylaldehyde complex; organotin compounds, including $Sn^{II}$ and $Sn^{IV}$ compounds, such as stannous acetate, stannous octoate (stannous 2-ethylhexanoate), dibutyltin oxide, dibutyltin dichloride, dibutyltin diacetate, dibutyltin dilaurate, dibutyltin maleate, dioctyltin diacetate and the like; other organo metal compounds, such as di-alkyl titanate, lead naphtenate, and so on. Catalysts for trimerization of NCO groups forming isocyanurate ring, such as tris(dimethylaminomethyl) phenol, N,N',N''-tris(dimethylaminopropyl)hexa-hydro-s-triazine and the like, may also be used. These catalysts are used in small amounts, for instance, from about 0.001 to about 5% based on the weight of the reaction mixture.

Exemplary of other auxiliaries are surfactants, as emulsifiers and foam stabilizers, particularly silicone surfactants (polysiloxane-polyoxyalkylene copolymers) being important. Illustrative of other known additives are flame retardants (such as phosphorus compounds, halogen compounds, $Sb_2O_3$ and the like), retarders (such as acidic compounds), colorants (pigments and dyes), internal mold release agents (such as hydrocarbon waxes and silicone compounds), age resistors, antioxidants (such as hindered phenols), plasticizers, solvents, thixotropants (such as colloidal silica), germicides, fillers (such as carbon black, titanium dioxide, diatomaceus earth, glass fiber, shattered glass fiber, talc, mica, silica, sand, aluminum powder, graphite, asbestos, and the like), and so on.

Polyurethanes of the present invention can be produced in known manners, including one-shot process, semi-prepolymer process and prepolymer process. There may be used any known mixing or foaming machines usually employed in producing polyurethanes. In case where no solvent is used, mixing machines, such as kneaders and extruders, can be used. Production of various non-cellular or cellular polyurethanes may be carried out in closed mold or open mold, usually by mixing raw materials with low pressure or high pressure mixing machines. Other methods, such as spray method, may also be used. It is preferred to produce polyurethanes by mixing and reacting using high pressure machines. Furthermore, polyurethanes may also be produced under vacuum to eliminate gases, such as air dissolved or mingled in raw materials, before and/or after mixing, preferably before mixing, of the raw materials.

The present invention is useful for producing high-resilient and firm, flexible and semi-rigid polyurethane foams, suitable for energy absorbers, or cushioning materials of automobiles, furnitures and so on, and for producing cellular and non-cellular rigid polyurethanes, as well as for producing polyurethanes suitable for adhesives, coatings and the like.

This invention is particularly useful for producing flexible polyurethane molded foams and slab foams.

The invention is also useful for producing molded articles by RIM (reaction injection molding) method. Molding by RIM method can be carried out in the same conditions as conventional RIM method. For instance, Component A is prepared by mixing uniformly active hydrogen atom-containing compounds such as (a) and optionally (b) and/or (c), and optionally other additives (catalysts, surfactants and/or other additives), and then optionally adding thereto blowing agents (water and/or volatile blowing agents) or air loading. As Component B, polyisocyanate is used. These Components A and B are charged in the tanks A and B of the high pressure foaming machine. Components A and B are mixed in the mixing head and introduced into the mold, via the injection nozzle attached to the mold beforehand. Molding conditions may be the same as those in the known RIM methods. For example, the raw materials (2-4 components), conditioned at a temperature of 25°-90° C., are intimately mixed in an impingement mixhead under a pressure of 100-200 Kg/cm²G and then injected into a closed mold preheated to a temperature of 30°-200° C. (preferably 60°-90° C.), followed by demolding within 0.1-5 minutes. After demolding, molded articles thus obtained may be further after-cured or annealed. Annealing can be carried out, for instance, for 0.3-100 hours at 60°-180° C., preferably 80°-160° C., more preferably 100°-150° C., particularly for 1-30 hours at 120°-140° C.

Polymer/polyol compositions, prepared by polymerizing a monomer in situ in a polyol in the presence of an inner-olefin containing at least 5 carbon atoms, in accordance with the present invention, are of lower viscosity even at a higher polymer content, and capable of providing polyurethanes having improved properties, such as compressive hardness.

By polymerizing a monomer in situ in a polyol in the presence of initiators comprising an azo compound and a peroxide having a 10 hours half-life period temperature which is lower by at least 10° C. than that of the azo compound, ratio of polymerization can be remarkably improved, and there be attained polymer/polyol compositions having improved dispersibility and are stable even at higher styrene content, and can provide polyurethane foams without causing scorching.

Thus, polyurethanes formed from polymer/polyol compositions according to this invention are particularly useful as automotive parts, including interior trim and exterior trim, such as handles, sheet cushion, crash pads, bumpers, fenders, door panels, trunk lid and outer bodies, as well as elastomeric applications, and household implements, such as furnitures.

Having generally described the invention, a more complete understanding can be obtained by reference to certain specific examples, which are included for purposes of illustration only and are not intended to be limiting unless otherwise specified.

Raw materials used in the following examples are as follows:

(1) Polyols:

Polyol A: a polyether polyol (OHV:34), produced by addition of PO to glycerol.

Polyol B: a polyether polyol (OHV: 42, EO content: 10%), produced by addition of PO to glycerol and sucrose (weight ratio 30/70), followed by tipping EO.

Polyol C: a polyether polyol (OHV: 55), produced by addition of PO to glycerol. EG: ethylene glycol.

(2) Ethylenically unsaturated monomers:

D-124: alpha-olefin (C12/C14 weight ratio 56:44). AN: acrylonitrile, ST: styrene.

(3) Inner-olefin:

Nonene (produced by Arco Chemical).

(4) Polyisocyanate:

TDI-80: TDI (2,4-/2,6-ratio: 80/20)

(6) Catalysts:

DABCO33LV: 33% solution of triethylene diamine in dipropylene glycol

U-28: tin catalyst (Neostan U-28, produced by Nitro Kasei K. K.)

(7) Silicone surfactants

L-520: polyether-polysiloxane block copolymer, produced by Nippon Uncar K. K.

Dispersion stability test of polymer/polyol composition was measured as follows:

Each polymer/polyol composition was centrifuged for 30 minutes at about 18,000 rpm with a centrifugal force of about 38,000 g, followed by turning the centrifuge tube upside down and allowing to stand for an hour. The weight % of the residue remained within the centrifuge tube, based on the weight of the initial polymer/polyol composition, was used as index of dispersion stability.

Measuring methods of properties of polyurethane foams or articles are as follows.

Density (kg/m$^3$), Tensile strength (kg/cm$^2$), Elongation at break (%), and Tear strength (kg/cm): JIS K-6301. 25% and 65% ILD (kg/314 cm$^2$), Rebound elasticity (%), and Compression set (%): JIS K-6382.

EXAMPLES I TO XVII, AND COMPARATIVE EXAMPLE i TO vii

According to formulations (parts) and polymerization conditions (temperature, °C., and time, hours) written in Tables 1, 2 and 3, polyols were charged into a reaction vessel equipped with a stirrer and temperature control means, and heated under stirring. Then, monomers, initiators and dodecyl mercaptan (hereinafter referred to as DM) were continuously fed by pump over 2 hours, while maintaining the temperature, followed by stirring at the same temperature. Finally, volatile materials were removed under heating to 110° C. at reduced pressure of 25 mmHg for 3 hours to obtain polymer/polyol compositions of Examples I to XVII and those of Comparative Examples i to vii (hereinafter referred to as P/Polyols I to XVII and P/Polyols i to vii, respectively). OH-V (mg KOH/g), viscosity (cps. at 25° C.) and stability (%) of these polymer polyols were measured. The results were as shown in Tables 1, 2 and 3.

TABLE 1

| Example No. | Example | | | | Comparative Example | | | |
|---|---|---|---|---|---|---|---|---|
| | I | II | III | IV | i | ii | iii | iv |
| Polyol B | 38.5 | 38.5 | 38.5 | 38.5 | 38.5 | 38.5 | 38.5 | 38.5 |
| Polyol C | 16.5 | 16.5 | 16.5 | 16.5 | 16.5 | 16.5 | 16.5 | 16.5 |
| AN | 15.8 | 15.8 | 15.8 | 15.8 | 15.8 | 15.8 | 15.8 | 15.8 |
| ST | 29.2 | 29.2 | 29.2 | 29.2 | 29.2 | 29.2 | 29.2 | 29.2 |
| D-124 | 2.5 | — | — | — | — | — | — | 2.5 |
| Nonene | 3.0 | 3.0 | 5.0 | — | — | — | — | — |
| Dodecene | — | — | — | 5.0 | — | — | — | — |
| Hexane | — | — | — | — | — | 5.0 | — | — |
| IPA | — | — | — | — | — | — | 5.0 | 5.0 |
| TCP | 0.3 | 0.3 | 0.3 | 0.3 | 0.3 | 0.3 | 0.3 | 0.3 |
| DM | 0.2 | 0.2 | 0.2 | 0.2 | 0.2 | 0.2 | 0.2 | 0.2 |
| Temperature | 120 | 120 | 120 | 120 | 120 | 120 | 120 | 120 |
| Time | 3.5 | 3.5 | 3.5 | 3.5 | 3.5 | 3.5 | 3.5 | 3.5 |
| Viscosity | 2900 | 3600 | 3500 | 4000 | Solid | 7500 | 9000 | 6800 |

(Note)
IPA: iso-propyl alcohol;
DM: dodecyl mercaptan

TABLE 2

| Example No. | Comparative Example | | | Example | | | | |
|---|---|---|---|---|---|---|---|---|
| | v | vi | vii | V | VI | VII | VIII | IX |
| Polyol A | 19.5 | 19.5 | 19.5 | 19.5 | 19.5 | — | — | — |
| Polyol B | 45.5 | 45.5 | 45.5 | 45.5 | 45.5 | 38.5 | 38.5 | 38.5 |
| Polyol C | — | — | — | — | — | 16.5 | 16.5 | 16.5 |
| AN | 17.5 | 17.5 | 17.5 | 17.5 | 17.5 | 22.5 | 15.8 | 20.0 |
| ST | 17.5 | 17.5 | 17.5 | 17.5 | 17.5 | 22.5 | 29.2 | 30.0 |
| D-124 | — | 2.0 | 5.0 | — | 2.0 | 2.5 | 2.5 | 2.5 |
| Nonene | — | — | — | 5.0 | 3.0 | 3.0 | 3.0 | 3.0 |
| AIBN | 0.7 | 0.7 | 0.7 | 0.7 | 0.7 | 0.9 | 1.4 | 2.3 |
| DM | 0.35 | 0.35 | 0.35 | 0.35 | 0.35 | 0.2 | 0.2 | 0.3 |
| Temperature | 125 | 125 | 125 | 125 | 125 | 120 | 120 | 120 |
| Time | 2.5 | 2.5 | 2.5 | 2.5 | 2.5 | 3.5 | 3.5 | 4.0 |
| Viscosity | 7000 | 4100 | 2000 | 2100 | 1200 | 3500 | 3100 | 5000 |

TABLE 3

| Example No. | X | XI | XII | XIII | XIV | XV | XVI | XVII |
|---|---|---|---|---|---|---|---|---|
| Polyol B | 56.0 | 56.0 | 56.0 | 56.0 | 56.0 | 56.0 | 56.0 | 49.0 |
| Polyol C | 24.0 | 24.0 | 24.0 | 24.0 | 24.0 | 24.0 | 24.0 | 21.0 |
| AN | 7.0 | 7.0 | 7.0 | 7.0 | 7.0 | 7.0 | 7.0 | 10.5 |
| ST | 13.0 | 13.0 | 13.0 | 13.0 | 13.0 | 13.0 | 13.0 | 19.5 |
| Nonene | 3.0 | 3.0 | 3.0 | 3.0 | 3.0 | — | — | — |
| IBP | — | — | — | 0.1 | — | 0.05 | — | 0.11 |
| BPND | — | 0.1 | — | — | 0.1 | 0.05 | 0.08 | — |
| TCP | — | — | 0.1 | — | — | — | — | — |
| AVN | — | — | — | 0.1 | 0.05 | — | — | 0.06 |

TABLE 3-continued

| Example No. | X | XI | XII | XIII | XIV | XV | XVI | XVII |
|---|---|---|---|---|---|---|---|---|
| AIBN | 1.0 | 0.1 | 0.1 | — | 0.05 | 0.05 | 0.03 | — |
| ACCN | — | — | — | — | — | 0.05 | 0.09 | 0.14 |
| Temperature | 130 | 120 | 110 | 100 | 110 | 100 | 120 | 120 |
| Time | 1.0 | 1.0 | 1.0 | 1.0 | 1.0 | 3.0 | ½ | ½ |
| Ratio of polymerization, % | 90.5 | 97.5 | 95.7 | 96.5 | 98.5 | 98.5 | 99.4 | 99.0 |
| Stability | 6.3 | 3.8 | 4.1 | 4.6 | 4.4 | 4.5 | 2.8 | 3.5 |
| Viscosity | 2400 | 2500 | 2300 | 2400 | 2000 | 2200 | 2700 | 3300 |

EXAMPLES 1 to 9, AND COMPARATIVE EXAMPLES 1 AND 2

Polyurethane foams were produced according to foaming formulations (parts), written in Tables 4 and 5.

Properties and density (kg/m$^3$, JIS K-6301) of the resulting foams were measured, and the results were shown in Tables 4 and 5.

TABLE 4

| Example No. | Comparative Example | | Example | | | | |
|---|---|---|---|---|---|---|---|
| | 1 | 2 | 1 | 2 | 3 | 4 | 5 |
| Polyol C | 100 | 50 | 500 | 0 | 50 | 50 | 50 |
| P/Polyol I | 0 | 0 | 50 | 100 | 0 | 0 | 0 |
| P/Polyol iv | 0 | 50 | 0 | 0 | 0 | 0 | 0 |
| P/Polyol VI | 0 | 0 | 0 | 0 | 50 | 0 | 0 |
| P/Polyol VII | 0 | 0 | 0 | 0 | 0 | 50 | 0 |
| P/Polyol VIII | 0 | 0 | 0 | 0 | 0 | 0 | 50 |
| Water | 4.5 | 4.5 | 4.5 | 4.5 | 4.5 | 4.5 | 4.5 |
| DABCO 33LV | 0.3 | 0.3 | 0.3 | 0.3 | 0.3 | 0.3 | 0.3 |
| U-28 | 0.30 | 0.26 | 0.26 | 0.22 | 0.28 | 0.28 | 0.26 |
| L-520 | 1.5 | 1.5 | 1.5 | 1.5 | 1.5 | 1.5 | 1.5 |
| TDI-80 | 54.6 | 52.2 | 52.2 | 49.7 | 50.8 | 52.2 | 52.2 |
| Density | 23.7 | 26.1 | 23.8 | 24.6 | 26.0 | 25.6 | 26.0 |
| 25% ILD | 10.6 | 16.4 | 17.0 | 28.9 | 16.8 | 18.0 | 17.1 |
| Tensile strength | 1.06 | 1.21 | 1.27 | 1.47 | 1.16 | 1.24 | 1.24 |
| Tear strength | 0.87 | 0.67 | 0.89 | 0.85 | 0.71 | 0.68 | 0.65 |
| Elongation at break | 174 | 100 | 103 | 58 | 106 | 102 | 100 |
| Rebound elasticity | 40 | 34 | 34 | 29 | 35 | 33 | 34 |
| Compression set | 3.2 | 6.4 | 6.5 | 35.0 | 8.7 | 5.9 | 5.8 |

TABLE 5

| Example No. | 6 | 7 | 8 | 9 |
|---|---|---|---|---|
| P/Polyol X | 100 | 0 | 0 | 0 |
| P/Polyol XI | 0 | 100 | 0 | 0 |
| P/Polyol XII | 0 | 0 | 100 | 0 |
| P/Polyol XVI | 0 | 0 | 0 | 100 |
| Water | 4.5 | 4.5 | 4.5 | 4.5 |
| DABCO 33LV | 0.3 | 0.3 | 0.3 | 0.3 |
| U-28 | 0.3 | 0.3 | 0.3 | 0.3 |
| L-520 | 1.5 | 1.5 | 1.5 | 1.5 |
| TDI-80 | 52.2 | 52.2 | 52.2 | 52.2 |
| Density | 23.6 | 23.3 | 23.4 | 23.5 |
| 25% ILD | 16.8 | 17.9 | 18.5 | 21.0 |
| Tensile strength | 0.86 | 0.99 | 1.05 | 1.12 |
| Tear strength | 0.84 | 0.86 | 0.90 | 0.95 |
| Elongation at break | 120 | 120 | 125 | 122 |
| Rebound elasticity | 35 | 34 | 35 | 35 |
| Compression set | 5.8 | 5.8 | 5.9 | 6.2 |

What is claimed as new and desired to be secured by Letters Patent is:

1. A polymer/polyol composition, when reacted with a polyisocyanate yields a polyurethane, wherein the polymer of said composition is formed by polymerizing (1) an ethylenically unsaturated monomer, in situ in (2) a polyol, in the presence of (3) an inner-olefin containing 5 to 30 carbon atoms; wherein said ethylenically unsaturated monomer (1) is different from said olefin (3); said polyol (2) comprising at least one polyol having a hydroxyl number of 15-200 selected from the group consisting of polyether polyols, polyester polyols, modified polyols, and polymer/polyols previously prepared in situ in any of these polyols; and said polymer being present in an amount of 1-80% based on the weight of said composition.

2. The composition of claim 1, wherein the amount of said inner-olefin (3) is 0.5-50% by weight, based on the total weight of (1), (2) and (3).

3. The composition of claim 1, wherein said monomer (1) is at least one monomer selected from the group consisting of aromatic hydrocarbon monomers, unsaturated nitriles, esters of acrylic acid and esters of methacrylic acid.

4. The composition of claim 1, wherein said monomer comprises at least one alpha-olefin containing 5-30 carbon atoms.

5. The composition of claim 4, wherein said monomer further comprises at least one other monomer selected from the group consisting of aromatic hydrocarbon monomers, unsaturated nitriles, ethylenically unsaturated carboxylic acids and derivatives thereof, other aliphatic hydrocarbon monomers, halogen-containing vinyl monomers, nitrogen-containing vinyl monomers and vinyl-modified silicones.

6. The composition of claim 5, wherein said monomer comprising 0.5-50% of said alpha-olefin.

7. The composition of claim 1, wherein said ethylenically unsaturated monomer is an alpha-olefin having 6-30 carbon atoms.

8. The composition of claim 1, wherein said polyol (2) comprises a polyether polyol.

9. A process for producing the polymer/polyol composition of claim 1, which comprises polymerizing (1) an ethylenically unsaturated monomer, in situ in (2) a polyol, in the presence of (3) an inner-olefin containing 5 to 30 carbon atoms and in the presence of an initiator, wherein said ethylenically unsaturated monomer (1) is different from said olefin (3).

10. The process of claim 9, wherein said initiator is at least one compound selected from the group consisting of azo compounds, peroxides, persulfates, perborates and persuccinates.

11. The process of claim 9, wherein said initiator comprises an azo compound, or a combination thereof with a peroxide having a 10 hours half-life period temperature which is lower by at least 10° C. than that of the azo compound.

12. The composition of claim 1, whrein said monomer (1) is at least one monomer selected from the group consisting of alpha-olefins containing 5-30 carbon atoms, aromatic hydrocarbon monomers, unsaturated nitriles, esters of acrylic acid and esters of methacrylic acid.

13. A process for producing a polyurethane, which comprises reacting an organic polyisocyanate with an active hydrogen atom-containing component comprising the polymer/polyol composition of claim 1.

14. The process of claim 13, wherein the reaction is performed in the presence of one or more additives.

15. The process of claim 14, wherein one or more additives are selected from the group consisting of catalysts, blowing agents and surfactants.

16. The process of claim 13, wherein said polyisocyanate is reacted with an active hydrogen atom-containing component comprising,
based on the weight of said component,
(i) at least 5% of said polymer/polyol composition;
(ii) 0–95% of at least one other high molecular weight polyol, having equivalent weight of 200–4,000, selected from the group consisting of polyether polyols, polyester polyols and modified polyols; and
(iii) 0–30% of at least one low molecular weight compound containing at least two active hydrogen atom-containing groups, said compound having equivalent weight of at least 30 and less than 200, selected from the group consisting of low molecular weight polyols and amines.

17. A polyurethane, produced by the process of claim 13.

* * * * *

UNITED STATES PATENT AND TRADEMARK OFFICE
CERTIFICATE OF CORRECTION

PATENT NO. : 5,272,204
DATED : December 21, 1993
INVENTOR(S) : Keiichi Akimoto et al.

It is certified that error appears in the above-indentified patent and that said Letters Patent is hereby corrected as shown below:

On the title page, Item [75],

The second inventor's name should read: --Takeshi Sumida--

Signed and Sealed this

Third Day of May, 1994

*Attest:*

BRUCE LEHMAN

*Attesting Officer*     Commissioner of Patents and Trademarks